United States Patent
Yerram et al.

(10) Patent No.: US 11,572,829 B2
(45) Date of Patent: Feb. 7, 2023

(54) SYSTEM AND METHOD FOR COMBINING COMPRESSOR BLEED FLOW AND VENTILATION FLOW OF GAS TURBINE ENGINE

(71) Applicant: GENERAL ELECTRIC COMPANY, Schenectady, NY (US)

(72) Inventors: Ravinder Yerram, Sugar Land, TX (US); Quoc Hoai Nguyen, Sugar Land, TX (US); Mohammad Mahabub, Richmond, TX (US); Tho V. Nguyen, Houston, TX (US)

(73) Assignee: General Electric Company, Schenectady, NY (US)

( * ) Notice: Subject to any disclaimer, the term of this patent is extended or adjusted under 35 U.S.C. 154(b) by 146 days.

(21) Appl. No.: 16/875,989

(22) Filed: May 16, 2020

(65) Prior Publication Data
US 2021/0355868 A1   Nov. 18, 2021

(51) Int. Cl.
  *F02C 6/08* (2006.01)
  *F02C 9/18* (2006.01)
(52) U.S. Cl.
  CPC . *F02C 6/08* (2013.01); *F02C 9/18* (2013.01)
(58) Field of Classification Search
  CPC ................. F02C 6/08; F02C 9/01; F02C 9/18
  See application file for complete search history.

(56) References Cited

U.S. PATENT DOCUMENTS

| | | | |
|---|---|---|---|
| 3,377,804 A | 4/1968 | Wright et al. | |
| 3,586,171 A | 6/1971 | Offer | |
| 4,565,505 A | 1/1986 | Woollenweber | |
| 5,072,862 A | 12/1991 | Keller | |
| 5,279,109 A | 1/1994 | Liu et al. | |
| 5,281,087 A | 1/1994 | Hines | |
| 5,325,661 A | 7/1994 | Rice | |
| 5,845,482 A | 12/1998 | Carscallen | |
| 8,505,310 B2 | 8/2013 | Zhang et al. | |
| 9,003,762 B2 | 4/2015 | Scipio et al. | |
| 9,752,502 B2 * | 9/2017 | Davis, Jr. | F02C 7/141 |
| 9,850,818 B2 * | 12/2017 | Kulkarni | F01D 15/10 |
| 9,938,874 B2 * | 4/2018 | Davis, Jr. | F01K 23/10 |
| 2009/0067988 A1 | 3/2009 | Praveen et al. | |
| 2011/0168482 A1 * | 7/2011 | Merchant | F01D 25/30 181/224 |

(Continued)

FOREIGN PATENT DOCUMENTS

WO    2018077839 A1    5/2018

OTHER PUBLICATIONS

European Extended Search Report for EP Application No. 21171366.4-1007 dated Oct. 5, 2021; 8 pgs.

*Primary Examiner* — William H Rodriguez
(74) *Attorney, Agent, or Firm* — Fletcher Yoder, P.C.

(57) ABSTRACT

A flow combiner is provided for a gas turbine engine. The flow combiner includes an outlet duct, a compressor bleed inlet duct coupled to the outlet duct, and a ventilation inlet duct coupled to the outlet duct. The compressor bleed inlet duct is configured to receive a bleed flow from a compressor of the gas turbine engine. The ventilation inlet duct is configured to receive a ventilation flow from an enclosure surrounding the gas turbine engine. The bleed flow and the ventilation flow are combined as an outlet flow through the outlet duct.

20 Claims, 5 Drawing Sheets

(56) References Cited

U.S. PATENT DOCUMENTS

| | | | | |
|---|---|---|---|---|
| 2013/0327012 A1* | 12/2013 | Mahabub | | F02C 7/047 |
| | | | | 60/39.093 |
| 2014/0157778 A1* | 6/2014 | Ponnuraj | | F01D 25/30 |
| | | | | 60/694 |
| 2015/0010382 A1* | 1/2015 | Subramaniyan | | F02C 3/34 |
| | | | | 415/68 |
| 2015/0132101 A1 | 5/2015 | Marsh et al. | | |
| 2016/0376908 A1* | 12/2016 | Reed | | F02C 9/18 |
| | | | | 60/39.5 |
| 2016/0376955 A1* | 12/2016 | Reed | | F01D 25/305 |
| | | | | 60/39.5 |
| 2016/0376956 A1* | 12/2016 | Kulkarni | | F02C 3/30 |
| | | | | 60/39.5 |
| 2016/0376992 A1* | 12/2016 | Davis, Jr. | | F02C 9/18 |
| | | | | 60/39.5 |
| 2017/0133909 A1* | 5/2017 | Morales Álvarez | | F02C 7/00 |
| 2017/0167304 A1* | 6/2017 | Scipio | | F01K 17/025 |
| 2017/0167379 A1* | 6/2017 | Scipio | | F02C 6/08 |
| 2017/0306845 A1* | 10/2017 | Laing | | F01D 25/14 |
| 2017/0306846 A1* | 10/2017 | Laing | | F02C 7/00 |
| 2018/0371952 A1* | 12/2018 | Drezek | | F01D 25/30 |
| 2019/0153963 A1* | 5/2019 | Kitaguchi | | F02C 7/26 |
| 2021/0317784 A1* | 10/2021 | Yerram | | F01D 25/30 |

* cited by examiner

SYSTEM AND METHOD FOR COMBINING COMPRESSOR BLEED FLOW AND VENTILATION FLOW OF GAS TURBINE ENGINE

BACKGROUND OF THE INVENTION

The subject matter disclosed herein relates to gas turbine engines, and more specifically systems and methods for combining a compressor bleed flow and a ventilation flow of a gas turbine engine.

A gas turbine engine generally includes a compressor, a combustor, and a turbine. The combustor combusts fuel with compressed air from the compressor, and provides hot combustion gases to the turbine to drive a load, such as an electric generator. The gas turbine engine may discharge a plurality of flows (e.g., exhaust gas flow, ventilation flow, compressor bleed flow, etc.) through separate flow paths, such as stacks. Unfortunately, each stack requires space and adds costs to the gas turbine engine. Each stack also may include various internal components, such as silencer baffles. As a result, the gas turbine engine may have duplicate parts (e.g., stacks, silencer baffles, etc.) to handle the plurality of flows.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a flow combiner, in which a bleed flow and a ventilation flow are combined as an outlet flow through an outlet duct. The flow combiner comprises the outlet duct; a compressor bleed inlet duct coupled to the outlet duct, wherein the compressor bleed inlet duct is configured to receive the bleed flow from a compressor of a gas turbine engine; and a ventilation inlet duct coupled to the outlet duct, wherein the ventilation inlet duct is configured to receive the ventilation flow from an enclosure surrounding the gas turbine engine.

In a second embodiment, a method comprising: receiving a bleed flow from a compressor of a gas turbine engine into a compressor bleed inlet duct coupled to an outlet duct of a flow combiner; and receiving a ventilation flow from an enclosure surrounding the gas turbine engine into a ventilation inlet duct coupled to the outlet duct, wherein the bleed flow and the ventilation flow are combined as an outlet flow through the outlet duct is provided.

In a third embodiment, a system includes a flow combiner, in which a high energy flow and a low energy flow are combined as an outlet flow through an outlet duct. The flow combiner comprises the outlet duct; a first inlet duct coupled to the outlet duct, wherein the first inlet duct is configured to receive the high energy flow, and the first inlet duct comprises an adjustable valve; and a second inlet duct coupled to the outlet duct, wherein the second inlet duct is configured to receive the low energy flow, and the second inlet duct comprises at least one fan.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
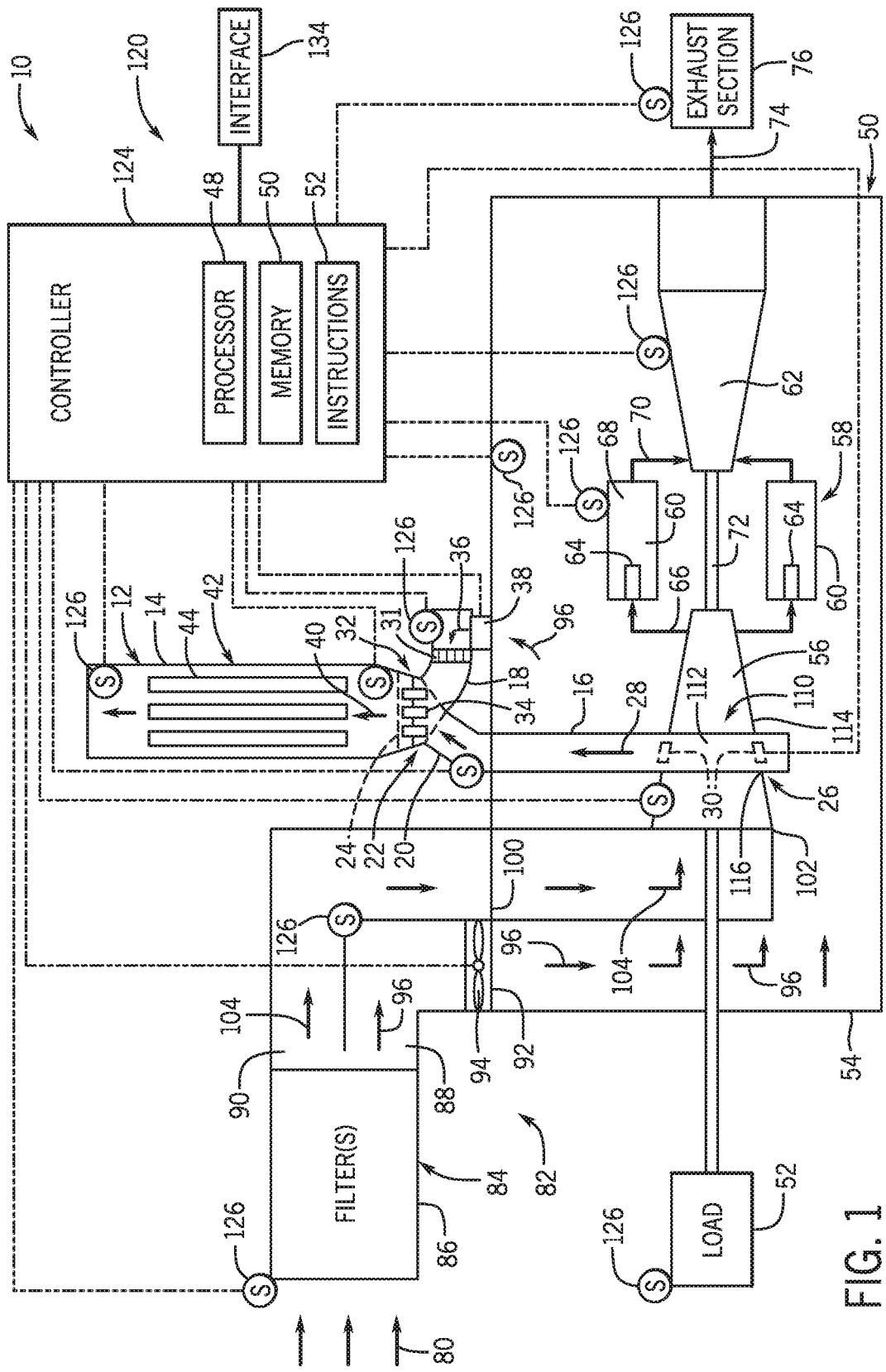
FIG. 1 is a schematic block diagram of an embodiment of a gas turbine system having a flow combiner configured to combine different flows (e.g., a ventilation flow and a compressor discharge flow)

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As discussed in greater detail below, the present embodiments described herein provide an efficient ventilation system that combines a ventilation flow from an enclosure disposed about a gas turbine engine and a bleed flow from a compressor of the gas turbine engine, via a flow combiner. Without the disclosed flow combiner, a gas turbine engine may include many duplicative parts (e.g., separate stacks and separate assemblies of silencers) for various discharge flows, such as the ventilation flow, the compressor bleed flow, and other flows. These duplicative parts result in greater space consumption, great installation costs, and greater maintenance costs. Unfortunately, the various discharge flows of the gas turbine engine may have significantly different flow rates, pressures, temperatures, and/or other characteristics at various operating stages (e.g., startup, steady state, shutdown, part load, full load, etc.) of the gas turbine engine.

Therefore, the system described, herein, is a combined ventilation system and silencer(s) to attenuate noise from the combined ventilation flow and bleed flow. By combining flows and using a single assembly of silencers, the ventilation system described, herein, may lower component and maintenance costs, thereby improving the efficiency of the gas turbine system. In order to effectively combine flows, the bleed flow and ventilation flow may be regulated based on various modes of operation of the gas turbine system. For example, during start-up mode, the bleed flow may be increasing but is set to a low amount of flow while the ventilation flow may be operating at full flow. During full load mode, the bleed flow may be closed while the ventilation flow may be operating at full flow. Meanwhile, during normal shutdown mode, the bleed flow may be operating at a medium amount of flow while the ventilation flow may be operating at full flow. Moreover, during an emergency shutdown or a load drop mode, the bleed flow may be operating at a maximum amount of flow while the ventilation flow may be operating at a reduced amount of flow. Combining ventilation and bleed flows involves continuously or periodically adjusting the flow rate of each flow to meet specific operating requirements of each mode. The flow combiner that enables the mixing of the bleed flow and ventilation flow includes two different channels. One channel may be designated as an inlet for the ventilation flow to enter the flow combiner while the other channel may be designated as an inlet for the bleed flow to enter the flow combiner. After both the ventilation flow and bleed flow have entered the flow combiner via their respective channels, both flows may merge within the flow combiner. In particular, the ventilation flow channel may include a collection of conduits that helps to inhibit backflow and helps to disperse the ventilation flow within the flow combiner.

FIG. 1 is a schematic block diagram of a gas turbine system 10 having a flow combiner 12 configured to combine different flows. The different flows may have substantially different flow rates, pressures temperatures, and fluid compositions. In the illustrated embodiment, the different flows may correspond to a compressor bleed flow and a ventilation flow. In particular, as discussed in detail below, the flow combiner 12 includes an outlet duct 14, a first inlet duct 16 (e.g., a compressor bleed inlet duct) coupled to the outlet duct 14, and a second inlet duct 18 (e.g., a ventilation inlet duct) coupled to the outlet duct 14).

As illustrated, the first inlet duct 16 and the second inlet duct 18 couple to a common duct portion 20 of the outlet duct 14. In some embodiments, the common duct portion 20 may include a flow combining (or mixing) section 22 having one or more flow mixers 24 (e.g., backflow inhibiters, flow baffles, flow dividers, flow conduits, etc.). For example, the one or more flow mixers 24 may include a backflow inhibiter 32 having a plurality of conduits 34 (e.g., a bundle of conduits) converging in a downstream flow direction of a fluid flow (e.g., compressor bleed flow 28 and ventilation flow 36) from the first and second inlet duct 16 and 18. The backflow inhibitor 32 (e.g., conduits 34) is configured to inhibit a backflow of the fluid flow (e.g., from the first inlet duct 16 to the second inlet duct 18, or vice versa). The backflow inhibitor 32 also may be configured to induce mixing of the fluid flows (e.g., 28, 36) in the common duct portion 20. The first inlet duct 16 may include or fluidly couple to a variable valve 26 (e.g., a variable bleed valve) configured to vary a fluid flow 28 (e.g., compressor bleed flow) entering the first inlet duct 16. The variable valve 26 may be adjustable between open and closed positions (e.g., to increase or decrease a flow rate, pressure, etc.) to help control the intake of the fluid flow 28 into the flow combiner 12, reduce backflow of the fluid flow 28 into the second inlet duct 18, and improve mixing in the outlet duct 14. For example, the variable valve 26 may include a plurality of adjustable valve elements 30 (e.g., rotatable doors or flaps).

The second inlet duct 18 may include a damper 31 configured to open in response to the fluid flow 36 (e.g., ventilation flow) and close in response to the fluid flow 36 stopping. The damper 31 may be a gravity damper configured to close one or more pivoting doors (e.g., 1, 2, 3, 4, 5, or more hinged damper doors) by gravity when the fluid flow 36 stops. Alternatively, the damper 31 may be a spring-loaded damper configured to bias the pivoting doors toward a closed position, such that the fluid flow 36 opens the pivoting doors when the force of the fluid flow 36 is sufficient to overcome the spring force. The damper 31 also may be configured to inhibit a backflow of the fluid flow 28 into the second inlet duct 18 against the incoming fluid flow 36. The second inlet duct 18 also may include at least one fan 38 (e.g., 1, 2, or 3 fans) configured to force the fluid flow 36 into the second inlet duct 18. The damper 31 may be configured to open in response to operation of the fan 38 (i.e., fan turned on) and close when the fan 38 ceases operation (i.e., fan turned off). The speed of the fan 38 may be adjustable (e.g., increased or decreased) to help control the intake of the fluid flow 36, reduce backflow of the fluid flow 28 against the fluid flow 36, and improve mixing of the fluid flows 28 and 36 in the outlet duct 14.

The fluid flows 28 and 36 combine as a combined fluid flow 40 in the flow combining section 22, and then the combined fluid flow 40 passes through a silencer section 42 in the outlet duct 14. The silencer section 42 may include a plurality of silencer baffles 44 (e.g., parallel silencer baffles) extending in a downstream direction of the combined fluid flow 40. The silencer baffles 44 are configured to reduce noise associated with the fluid flows 28, 36, and 40 passing through the flow combiner 12. For example, each silencer baffle 44 may include an outer enclosure (e.g., perforated wall) and internal sound absorption structure (e.g., sound absorption material, chambers, passages, baffles, etc.). Each silencer baffle 44 may be elongated in the downstream direction and may include an aerodynamic shape (e.g., an airfoil shape). The outlet duct 14 and the silencer section 42 (e.g., silencer baffles 44) may be designed to handle a maximum load (e.g., flow rate, pressure, temperature, noise, etc.) expected for both the compressor bleed flow 28 and the ventilation flow 36.

In the illustrated embodiment, the flow combiner 12 is used to combined two different flows (e.g., flows with different energy levels) from the gas turbine system 10. In some embodiments, the flow combiner 12 may be configured to combine any number (e.g., 2, 3, 4, 5, 6, or more) different flows from the gas turbine system 10 or any other system generating different flows (e.g., different flow rates, pressures, etc.). For example, the different flows may be described as high energy and low energy flows, wherein the high energy flow has a relatively higher pressure, a relatively higher temperature, and/or a relatively higher flow rate than the low energy flow. In the illustrated embodiment, the compressor bleed flow 28 may be described as a high energy flow, while the ventilation flow 36 may be described as a low energy flow. Accordingly, the use of "high energy" and "low energy" with reference to flows (e.g., high energy and low energy flows) may be used merely as a relative comparison of the flows. For example, the high energy flow may have a pressure, temperature, and/or flow rate that is greater than the low energy flow by some percentage or multiplication factor (e.g., 1.1, 1.2, 1.3, 1.4, 1.5, 2, 2.5, 3, 4, 5, 10, 20, 30, 40, 50, or more). If additional flows are combined in the flow combiner 12, then the flow combiner 12 may include additional inlet ducts similar to the inlet ducts 16 and 18. However, in the following discussion, the flow combiner 12 is described in context of two combined flows from the gas turbine system 10, and more specifically a compressor bleed flow as the fluid flow 28 and a ventilation flow as the fluid flow 36.

The gas turbine system 10 includes a gas turbine engine 50 coupled to a load 52, such as an electrical generator. The gas turbine system 10 may be stationary of mobile, such as a trailer mounted power plant (e.g., generator 52 driven by gas turbine engine 50). The gas turbine system 10 also includes a housing or enclosure 54 disposed about the gas turbine engine 50, such that a ventilation space or volume is disposed about the gas turbine engine 50 inside of the enclosure 54. The gas turbine engine 50 includes a compressor section or compressor 56 having one or more compressor stages (e.g., any number from 1 to 30 stages), a combustor section 58 having one or more combustors 60, and a turbine section or turbine 62 having one or more turbine stages (e.g., any number from 1 to 30 stages). Each compressor stage of the compressor 56 includes a plurality of compressor blades configured to compress an intake air. Each combustor 60 includes one or more fuel nozzles 64 configured to supply a fuel and compressed air 66 from the compressor 56 into a combustion chamber 68, where the fuel combusts to generate hot combustion gases 70. The hot combustion gases flow through the turbine 62 driving the one or more turbine stages to rotate a shaft 72 (e.g., one or more shafts) coupled to the turbine 62, the compressor 56, and the load 52. Each turbine stage of the turbine 62 includes a plurality of turbine blades driven by the hot combustion gases 70. Eventually, the turbine 62 discharges the hot combustion gases 70 as an exhaust gas 74 into and through an exhaust section 76, such as an exhaust duct and/or exhaust stack.

The gas turbine system 10 routes an intake air 80 through an air intake system 82 into the enclosure 54 and the compressor 56. In the illustrated embodiment, the air intake system 82 includes a filter section 84 having one or more air filters 86, an air inlet duct 88 (e.g., ventilation intake duct) coupled to the enclosure 54, and an air inlet duct 90 (e.g., compressor intake duct) coupled to the compressor 56. The air inlet duct 88 couples to an intake port or opening 92 in the enclosure 54, and the air inlet duct 88 may include one or more fans 94 (e.g., electric motor driven fans) configured to help force a ventilation airflow 96 through the enclosure 54. Eventually, the ventilation flow 96 enters the second inlet duct 18 (e.g., ventilation inlet duct) of the flow combiner 12 as the fluid flow 36.

The air inlet duct 90 couples to (or extends through) an intake port or opening 92 in the enclosure 54, and the air inlet duct 90 extends internally into the enclosure 54 and couples to a compressor inlet 102 of the compressor 56. The air inlet duct 90 is configured to supply a compressor intake flow 104 into the compressor 56, which then compresses the air for use throughout the gas turbine engine 50. For example, the compressed air 66 may be used for combustion and cooling in the combustor section 58, cooling in the turbine 62, and cooling elsewhere in the gas turbine engine 50. In certain embodiments, the compressed air 66 used for cooling may be bled from the compressor 56 at any suitable location (e.g., compressor bleed flow at various stages of the compressor 56). Additionally, the compressor bleed flow may be discharged from the gas turbine system 10 through the flow combiner 12.

In the illustrated embodiment, the first inlet duct 16 (e.g., compressor bleed inlet duct) of the flow combiner 12 is coupled to a compressor bleed portion 110 of the compressor 56. In particular, the first inlet duct 16 may include a compressor bleed intake conduit 112 coupled to an outer wall 114 of the compressor 56 at the compressor bleed portion 110. For example, the compressor bleed intake conduit 112 may extend at least partially or entirely circumferentially around the outer wall 114 of the compressor 56, such as at least 180, 240, 300, or 360 degrees around the compressor 56. The compressor bleed intake conduit 112 may include a compressor opening 116 configured to fit around the outer wall 114 of the compressor 56. In certain embodiments, the outer wall 114 of the compressor 56 may include one or more compressor bleed openings configured to enable a compressor bleed flow into the first inlet duct 16. As discussed above, the first inlet duct 16 includes the variable valve 26 (e.g., variable bleed valve (VBV)) having one or more adjustable valve elements 30 (e.g., doors or flaps) configured to adjust the compressor bleed flow as the fluid flow 28 into the flow combiner 12. The variable valve 26 may include one or more electrical actuators, such as a common electric actuator or a separate electrical actuator for each of the plurality of adjustable valve elements 30.

The gas turbine system 10, including the variable valve 26, the fan 38, the fan 94, the fuel injection via fuel nozzles 64, and other operating parameters, may be controlled by a control system 120 having a monitoring system 122 coupled to a controller 124. The monitoring system 122 includes a plurality of sensors 126 (indicated by S) distributed throughout the gas turbine system 10 to monitor various operating conditions. For example, the sensors 126 may measure ambient conditions (e.g., humidity, temperature, etc.) outside of the gas turbine system 10. The sensors 126 may measure air intake conditions (e.g., flow rate, temperature, pressure) in the air intake system 82. The sensors 126 may measure compressor conditions (e.g., flow rate, temperature, and pressure of compressed air 66 and compressor bleed flow 28 from the compressor 56). The sensors 126 may measure ventilation conditions (e.g., flow rate, temperature, and pressure of the ventilation air flow 96 in the enclosure 54 and the ventilation flow 36 in the flow combiner 12). The sensors 126 may measure combustion conditions (e.g., fuel flow, fuel temperature, fuel pressure, fuel composition, Wobbe index, fuel-air ratio, flame temperature or intensity, combustion dynamics, and levels of emissions of pollutants such as $NO_X$, $SO_X$, $CO_2$, CO, particulate matter, etc.). The sensors 126 may measure turbine conditions (e.g., flow rate, temperature, and pressure of combustion gases 70 in the turbine 62). The sensors 126 may also measure a rotational speed, a clearance between rotating blades and walls of the compressor 56 and the turbine 62, and vibration of the gas turbine engine 50. The sensors 126 may measure a load on the gas turbine engine 50, such as a part load or full load condition of the gas turbine engine 50. The sensors 126 may monitor an operating state of the gas turbine engine 50, such as a startup condition, a steady state condition, or a shut down condition. The sensors 126 may monitor generator parameters (e.g., power output), conditions on a power grid, output power from the turbine 62, and so forth.

The sensors 126 may include a variety of sensor types to measure the foregoing parameters. For example, the sensors 126 may include temperature sensors, such as thermocouples, thermistors, and the like, disposed in the flow combiner 12 and throughout the gas turbine system 10. The sensors 126 may also include flow sensors, such as flowmeters (e.g., differential pressure flowmeters, velocity flowmeters, mass flowmeters, positive displacement flowmeters, open channel flowmeters) and liquid level sensors such as continuous level transmitters, ultrasonic transducers, laser level transmitters, and so on, disposed in the flow combiner 12 and throughout the gas turbine system 10. Additionally, the sensors 126 may include pressure sensors, such as piezo-resistive pressure sensors, differential pressure sensors, optical pressure sensors, and so on, included in the flow combiner 12 and throughout the gas turbine system 10. Fuel properties may be sensed and/or otherwise provided to the controller 124, e.g., via a human operator interface in the flow combiner 12 and the gas turbine system 10. The fuel properties may include moisture content, carbon content, chemical composition, specific gravity, ambient temperature, energy content, certain "numbers" (e.g., Wobbe Index, cetane number, octane number, and so on), or a combination thereof. Exhaust emissions may be measured by emissions sensors, such as $NO_X$ sensors, $SO_X$ sensors, $CO_2$ sensors, and CO sensors.

The controller 124 is configured to receive and process the measured input from the sensors 126 and control operation of the gas turbine system 10, including the fluid flows 28, 36, and 40 through the flow combiner 12. The controller 124 includes one or more processors 128, memory 130, and instructions 132 stored on the memory 130 and executable by the processors 128 to control operation of the gas turbine system 10. The processors 128 may include one or more "general-purpose" microprocessors, one or more special-purpose microprocessors, and/or one or more application specific integrated circuits (ASICS), or some combination thereof. For example, the processor 128 may include one or more reduced instruction set (RISC) processors. The memory 130 may store information such as control software, look up tables, configuration data, etc. The memory 130 may include a tangible, non-transitory, machine-readable medium, such as a volatile memory (e.g., a random access memory (RAM)) and/or a nonvolatile memory (e.g., a read-only memory (ROM), flash memory, a hard drive, or any other suitable optical, magnetic, or solid-state storage medium, or a combination thereof). The memory 130 may store a variety of information, which may be suitable for various purposes. For example, the memory 130 may store machine-readable and/or processor-executable instructions 132 (e.g., firmware or software) for the processor execution.

The controller 124 may be communicatively coupled to an operator interface 134 (e.g., a human machine interface (HMI)), and one or more actuators suitable for controlling components of the gas turbine system 10. For example, an actuator (e.g., electric actuator) may be coupled to or integrated with each of the variable valve 26, the fan 38, the fan 94, a fuel supply for the combustion section 58, and other portions of the gas turbine engine 50. The controller 124 also may be coupled to valves, switches, positioners, pumps, and the like, suitable for controlling the various components of the gas turbine engine 50. The controller 124 may receive data from the sensors 126, and may be used to control the compressor 56, the combustors 60, the turbine 62, the load 52, and flows through the flow combiner 12. As discussed in further detail below, the controller 124 is configured to control the fluid flows 28, 36, and 40 through the flow combiner 12 based on various sensor feedback and operational modes of the gas turbine system 10 (e.g., startup mode, steady state mode, shutdown mode, emergency mode, full load mode, part load mode, etc.). In each of these modes, the controller 124 may adjust the variable valve 26 to adjust (e.g., increase or decrease) the compressor bleed flow 28, adjust one or both of the fans 38 and 94 to adjust (e.g., increase or decrease) the ventilation flow 36, or a combination thereof.

Figure 4:
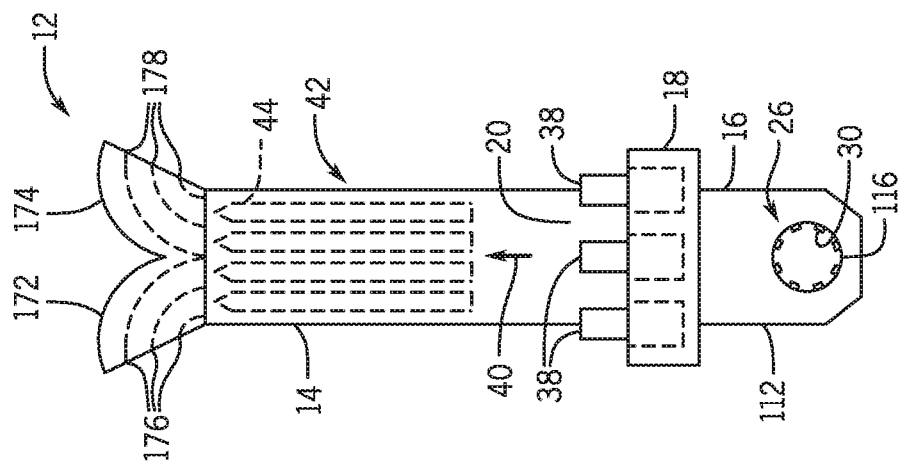
FIG. 4 is a front view of an embodiment of the flow combiner of FIG. 2.
Figure 3:
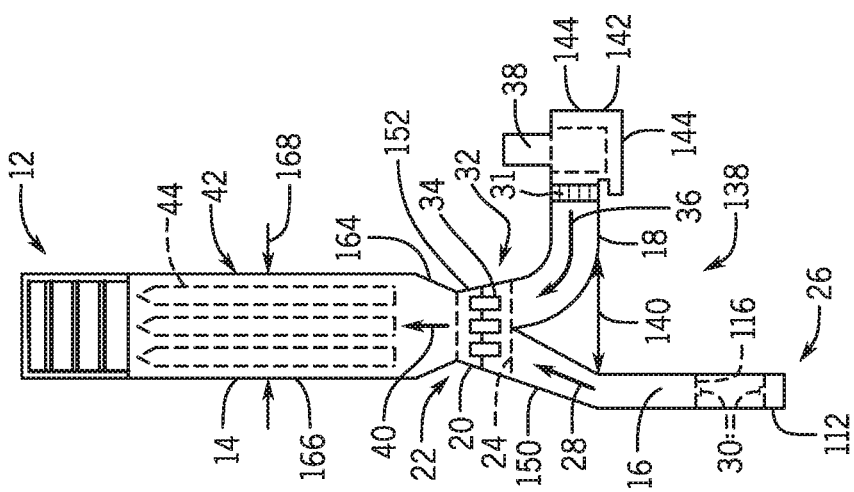
FIG. 3 is a side view of an embodiment of the flow combiner of FIG. 2.
Figure 2:
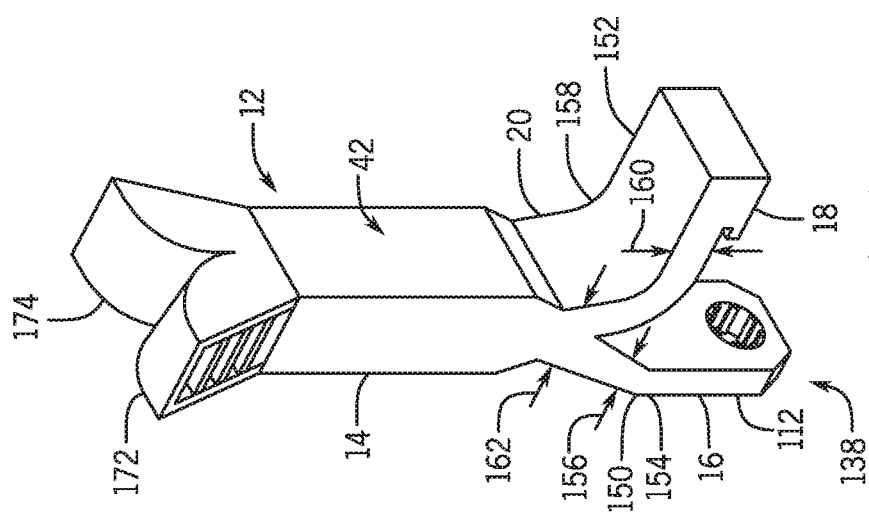
FIG. 2 is a perspective view of an embodiment of the flow combiner of FIG. 1.

FIGS. 2, 3, and 4 are detailed views of an embodiment of the flow combiner 12 of FIG. 1. In particular, FIG. 2 is a perspective view of an embodiment of the flow combiner 12 of FIG. 1. FIG. 3 is a side view of an embodiment of the flow combiner of FIG. 2. FIG. 4 is a front view of an embodiment of the flow combiner of FIG. 2. Additional details of the flow combiner 12 are now described with reference to FIGS. 2-4.

As illustrated in FIGS. 2 and 3, the illustrated inlet ducts 16 and 18 converge toward another and the outlet duct 14 in a Y-shaped structure 138. For example, the inlet ducts 16 and 18 may converge at an angle 140, such as 10 to 120 degrees, 20 to 90 degrees, or 30 to 60 degrees. The inlet duct 16 may turn from the compressor bleed intake conduit 112 toward the common duct portion 20 of the outlet duct 14. For example, the compressor bleed intake conduit 112 may be substantially parallel to the outlet duct portion 14. The inlet duct 18 may turn from a fan housing portion 142 (e.g., upstream duct portion having inlet 144) toward the common duct portion 20 of the outlet duct 14. For example, the fan housing portion 142 may be substantially perpendicular to the outlet duct portion 14. The flow combiner 12 also may include an intermediate duct portion 150 (e.g., diverging duct portion) between the compressor bleed intake conduit 112 and the common duct portion 20, and an intermediate duct portion 152 (e.g., diverging duct portion) between the fan housing portion 142 and the common duct portion 20. These intermediate duct portions 150 and 152 (e.g., diverging duct portion) may define the angle 140 of convergence of the inlet ducts 16 and 18.

The diverging duct portion 150 of the first inlet duct 16 (e.g., compressor bleed inlet duct) and the diverging duct portion 152 of the second inlet duct 18 (e.g., ventilation inlet duct) may help to control the combination of the fluid flows 26 and 38 into the common duct portion 20. In the illustrated embodiment, the diverging duct portion 150 has duct walls 154 that diverge and a cross-sectional flow area 156 that expands or increases in a downstream direction of the fluid flow 28. Similarly, the diverging duct portion 152 has duct walls 158 that diverge and a cross-sectional flow area 160 that expands or increases in a downstream direction of the fluid flow 36. However, in some embodiments, the cross-sectional flow areas 156 and 158 of the inlet ducts 16 and 18 may be entirely or partially constant, diverging, and/or converging in the downstream direction of the fluid flows 28 and 36, respectively. Additionally, a first minimum of the cross-sectional flow area 156 of the inlet duct 16 may be equal to, greater than, or less than a second minimum of the cross-sectional flow area 158 of the inlet duct 18 (e.g., the first minimum may be greater than the second minimum if the fluid flow 28 is a higher energy flow than the fluid flow 36). Similarly, a first maximum of the cross-sectional flow area 156 of the inlet duct 16 may be equal to, greater than, or less than a second maximum of the cross-sectional flow area 158 of the inlet duct 18 (e.g., the first maximum may be greater than the second maximum if the fluid flow 28 is a higher energy flow than the fluid flow 36). In some embodiments, the divergence of duct walls 154 and/or the expansion of the cross-sectional flow area 156 may be the same or different (e.g., greater for a higher energy flow) than the divergence of duct walls 158 and/or the expansion of the cross-sectional flow area 160.

As further illustrated in FIGS. 2 and 3, the common duct portion 20 of the outlet duct 14 may have a cross-sectional flow area 162 that is greater than both the cross-sectional flow area 156 of the inlet duct 16 and the cross-sectional flow area 160 of the inlet duct 18. The common duct portion 20 may include the flow combining section 22 with the plurality of flow mixers 24 (e.g., conduits, channels, baffles, etc. to help guide the flows being mixed together). For example, the flow mixers 24 may include the backflow inhibiter 32 having the plurality of conduits 34 converging in the downstream flow direction of the fluid flow (e.g., 28, 36), thereby helping to inhibit backflow while combining and mixing the fluid flow in the common duct portion 20. Details of the backflow inhibiter 32 are discussed in further detail below with reference to FIG. 5. The outlet duct 14 also may include a diverging duct portion 164 that diverges in a downstream direction of the combined fluid flow 40. The silencer section 42 may be disposed in a uniform duct portion 166 having a cross-sectional flow area 168 that is constant in the downstream direction of the combined fluid flow 40. The outlet duct 14 may include a discharge section 170 having oppositely oriented turning duct portions 172 and 174, which help disperse the combined flow 40 being discharged into the atmosphere. As illustrated in FIG. 4, the turning duct portions 172 and 174 may include internal turning vanes or baffles 176 and 178, respectively. The baffles 176 and 178 are configured to split the combined fluid flow 40 and guide the split flows outwardly through the turning duct portions 172 and 174.

As discussed above, the flow combiner 12 may include various flow controls configured to control a ratio of the fluid flow 28 relative to the fluid flow 36, thereby helping to improve the combination of the fluid flows 28 and 36 without causing undesirable backflow and/or overloading the silencer section 42. In particular, the illustrated embodiment includes the variable valve 26 (e.g., variable bleed valve (VBV)) having the plurality of adjustable valve elements 30 (e.g., doors or flaps that open and close) spaced circumferentially about the compressor opening 116, which is configured to extend around the outer wall 114 of the compressor 56 as illustrated in FIG. 1. The adjustable valve elements 30 may include actuators (e.g., electric actuators) coupled to the controller 124, such that the controller 124 can adjust the position of the adjustable valve elements 30 based on sensor feedback to help improve the flow combination in the flow combiner 12. The adjustable valve elements 30 may be configured to rotate and/or move axially between open and closed positions. The illustrated embodiment also includes the plurality of fans 38 in the inlet duct 18. The controller 124 is configured to selectively operate (i.e., turn on or off) and adjust the speed of (e.g., increase or decrease the fan speed of) each of the fans 38 independently or in combination with one another based on sensor feedback to help improve the flow combination in the flow combiner 12. The illustrated embodiment includes three fans 38 arranged in parallel in the inlet duct 18. However, embodiments of the flow combiner 12 may have any number of fans 38 (e.g., 1, 2, 3, 4, 5, 6, 7, 8, 9, or 10) arranged in series, in parallel, or a combination thereof. By adjusting the variable valve 26 and/or the fans 38, the controller 124 can help enable a successful combination of the fluid flows 28 and 36 in the flow combiner 12 without causing backflow (e.g., backflow of the fluid flow 28 into the inlet duct 18) or overloading the flow combiner 12. The inlet duct 18 also includes the damper 31 configured to open in response to the fluid flow 36 and close in response to the fluid flow 36 stopping.

Using the features described above, the flow combiner 12 combines or mixes two different types of flows, e.g., the compressor bleed flow 28 (e.g., a variable bleed valve (VBV) flow) extracted or bled from the compressor 56 and the ventilation flow 36, 96 from the enclosure 54 surrounding the gas turbine engine 50. In one embodiment, the compressor bleed flow 28 may be a high energy variable flow compared to the ventilation flow 36, which may be a continuous low energy flow. For example, the compressor bleed flow 28 may have a pressure range of 15 to 40 psi or any other suitable pressure range depending on the extraction point on the compressor 56. In contrast, the ventilation flow 36 may have a pressure range of 10 to 15 psi or any other suitable pressure range for ventilating the enclosure 54. In another embodiment, the compressor bleed flow 28 may be a high-temperature flow compared to the ventilation flow 36, which may be a low-mid temperature flow. For instance, the compressor bleed flow 28 may have a temperature range of 260° F. to 300° F. In contrast, the ventilation flow 36 may have a temperature range of 120° F. to 200° F. In a further embodiment, the compressor bleed flow 28 may operate as a discrete flow during certain time intervals that may range in duration from 1 to 10 seconds or any other suitable time duration. On the other hand, the ventilation flow 36 may operate as a continuous flow. Although the compressor bleed flow 28 and the ventilation flow 36 may have substantially different characteristics (e.g., noise levels, continuous vs intermittent, and energy levels based on pressures, temperatures, and flow rates), the flow combiner 12 is able to successfully combine the flows 28 and 36 using the variable valve 26, the fans 38, the damper 31, and the backflow inhibiter 32 while using a common silencer section 42. In order to improve the handling of both the compressor bleed flow 28 and the ventilation flow 36 in the flow combiner 12, the controller 124 may control flow rates of both flows 28 and 36 based on a particular mode of operation of the gas turbine system 10. The various modes of operation of the gas turbine system 10 will be described in more detail below.

Figure 5:
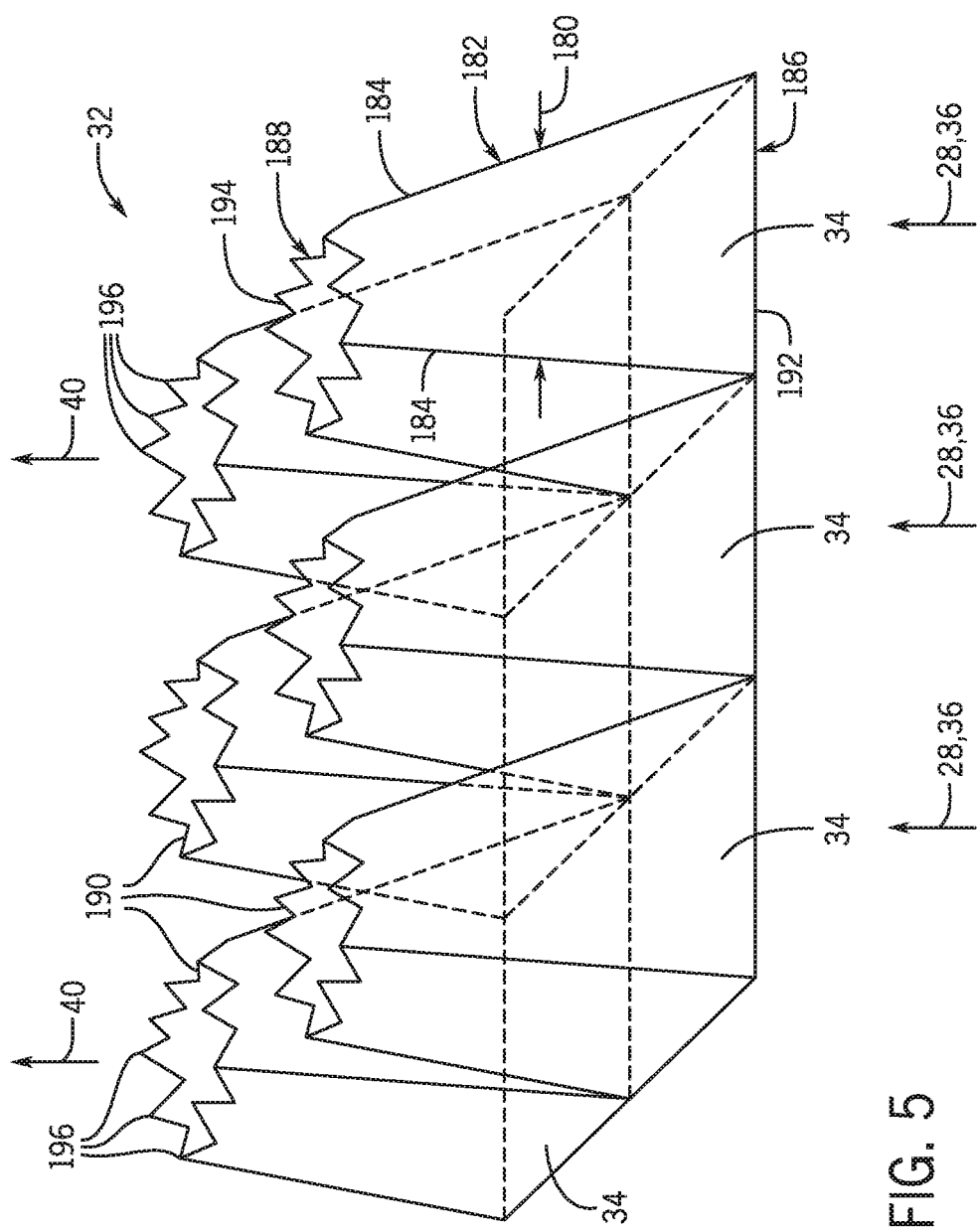
FIG. 5 is a perspective view of an embodiment of a backflow inhibiter of the flow combiner as illustrated in FIGS. 1 and 3, further illustrating an embodiment of the plurality of conduits of the backflow inhibiter.

FIG. 5 is a perspective view of an embodiment of the backflow inhibiter 32 of the flow combiner 12 as illustrated in FIGS. 1 and 3, further illustrating an embodiment of the plurality of conduits 34 of the backflow inhibiter 32. As discussed above, the plurality of conduits 34 are configured to help combine and mix the fluid flows 28 and 36 from the first and second inlet ducts 16 and 18 while inhibiting backflow from one inlet duct to another (e.g., from the first inlet duct 16 into the second inlet duct 18 and into the enclosure 54). As illustrated, each conduit 34 has a cross-sectional flow area 180 that shrinks or decreases in the downstream flow direction. For example, each conduit 34 may have a tapered geometry 182, e.g., duct walls 184 that are angled toward one another in the downstream flow direction of the fluid flow (e.g., 28 and 36). In certain embodiments, each conduit 34 may include a conical shaped conduit, a tapered square shaped conduit, or a tapered polygonal shaped conduit. The backflow inhibiter 32 may include any number of plurality of conduits 34 (e.g., 2, 3, 4, 5, 6, 7, 8, 9, 10, 15, 20, or more). The conduits 34 may include two or more conduits of the same size and shape, two or more conduits of different sizes, two or more conduits of different shapes, or any combination thereof.

Each conduit 34 includes an inlet 186 and an outlet 188 having a downstream edge 190. Each conduit 34 has a first dimension 192 at the inlet 186 and a second dimension 194 at the outlet 188. The dimensions 192 and 194 may include a width, a diameter, or a cross-sectional flow area of the conduit 34. The dimension 194 of the outlet 188 is less than the dimension 192 of the inlet 186 by some percentage or factor to help inhibit backflow. For example, the dimension 194 may be less than or equal to approximately 10, 20, 30, 40, 50, 60, 70, or 80 percent of the dimension 192. In certain embodiments, the dimension 192 may correspond to a maximum dimension of the conduit 34 while the dimension 194 may correspond to a minimum dimension of the conduit 34. The outlet 188 may also define a throat or flow restriction orifice that regulates the fluid flow (e.g., 28 and 36) and inhibits the backflow. Additionally, the dimensions 192 and 194 may be selected to restrict or regulate the fluid flow (e.g., 28 and 36) from the inlet ducts 16 and 18 into the outlet duct 14 of the flow combiner 12, while also inhibiting backflow of the fluid flow (e.g., compressor bleed flow 28 into the inlet duct 18). For example, the dimensions 192 and 194 may be increased to increase the fluid flow (e.g., 28 and 36), or the dimensions 192 and 194 may be decreased to reduce the fluid flow (e.g., 28 and 36). The conduits 34 also may vary in size, shape, quantity, and rate of convergence (or angle of convergence) from the inlet 186 to the outlet 188 to help regulate the fluid flow (e.g., 28 and 36) and inhibit backflow. The downstream edge 190 of the outlet 188 may be a smooth edge or a variable edge (e.g., a jagged or toothed edge having a plurality of teeth 196). The variable edge with teeth 196 may be configured to help spread the fluid flow (e.g., 28 and 36) into the flow combiner 12 while also adding additional surface area to inhibit backflow.

Figure 6:
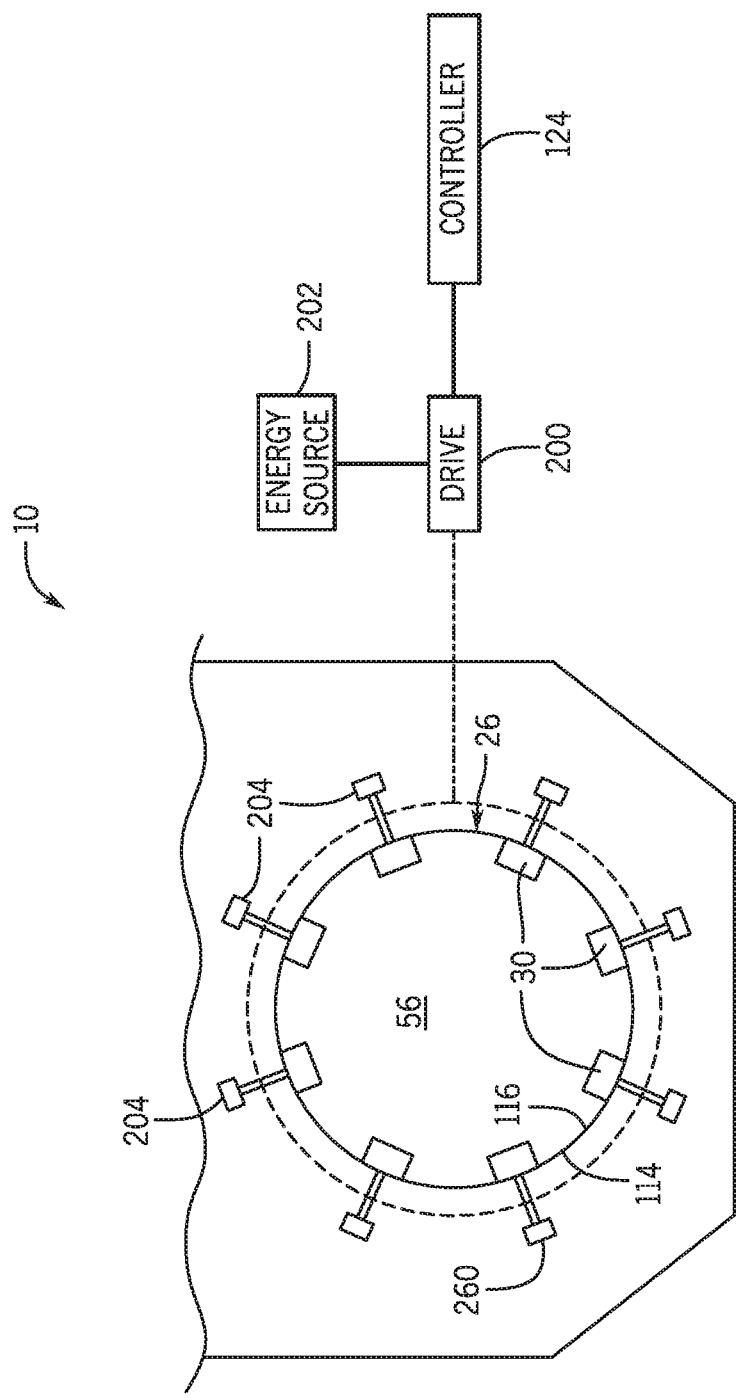
FIG. 6 is a schematic cross-sectional side view of the flow combiner coupled to the compressor of the gas turbine system of FIG. 1, illustrating a compressor bleed intake conduit having a variable bleed valve configured to adjust a compressor bleed flow into the flow combiner.

FIG. 6 is a schematic cross-sectional side view of the flow combiner 12 coupled to the compressor 56 of the gas turbine system 10 of FIG. 1, illustrating the compressor bleed intake conduit 112 having the variable valve 26 (e.g., variable bleed valve (VBV)) configured to adjust the compressor bleed flow 28 into the flow combiner 12. The compressor bleed intake conduit 112 may be an integral portion (i.e., one-piece) with the inlet duct 16 of the flow combiner 12, or the compressor bleed intake conduit 112 may be a separate piece removably or fixedly coupled to the inlet duct 16. The compressor 56 is disposed inside of the compressor bleed intake conduit 112 along the compressor opening 116. As illustrated, the compressor opening 116 is annular and thus fits around the outer wall 114 (e.g., annular wall) of the compressor 56. However, the compressor opening 116 and the outer wall 114 may have other shapes at the connection between the compressor bleed intake conduit 112 and the compressor 56.

The compressor bleed intake conduit 112 includes the variable valve 26 having the plurality of adjustable valve elements 30 (e.g., doors or flaps) disposed circumferentially about the compressor opening 116. The adjustable valve elements 30 help regulate the compressor bleed flow 28 in the inlet duct 16, and thus within the flow combiner 12. In some embodiments, the adjustable valve elements 30 may be a collection of circumferentially spaced valves, doors, or flaps, which are configured to rotate or move axially between open and closed positions. The adjustable valve elements 30 may vary in size, shape, and quantity. A uniform or non-uniform circumferential gap may be present between the adjustable valve elements 30. For instance, each of the adjustable valve elements 30 may be separated from one another via a circumferential gap with a regular interval size such as 6 inches, 1 foot, or any other suitable distance. In order to regulate the compressor bleed flow 28 in the inlet duct 16 and within the flow combiner 12, openings and closings of the adjustable valve elements 30 may be regulated via a drive 200. The adjustable valve elements 30 may open and close simultaneously or periodically to adjust the compressor bleed flow 28.

In certain embodiments, the drive 200 may include an electric drive, a fluid drive (e.g., a hydraulic drive and/or a pneumatic drive), or a combination thereof. The drive 200 may be coupled to an energy source 202 and one or more actuators 204 coupled to the adjustable valve elements 30. For example, the energy source 202 may include an electrical power supply and/or a fluid supply (e.g., a pressurized fluid tank, a compressor, or a pump). The drive 200 is configured to move the actuators 204, which in turn move the adjustable valve elements 30 between open and closed positions. Accordingly, the actuators 204 may include mechanical linkages, rotational joints, piston-cylinder assemblies, or transmission assemblies configured to transfer a force from the drive 200 to the adjustable valve elements 30. In fluid driven embodiments, the drive 200 (e.g., fluid drive) uses pressurized fluid (e.g., liquid or gas) from the energy source 202 (e.g., fluid supply) to provide the force to regulate the openings and closings of the adjustable valve elements 30. For example, the drive 200 (e.g., fluid drive) may include a piston-cylinder assembly driven by the pressurized fluid from the energy source 202. Additionally, the drive 200 may be controlled by the controller 124 to adjust the position of the adjustable valve elements 30 and thus vary the flow of the compressor bleed flow 28 through the flow combiner 12.

Figure 7:
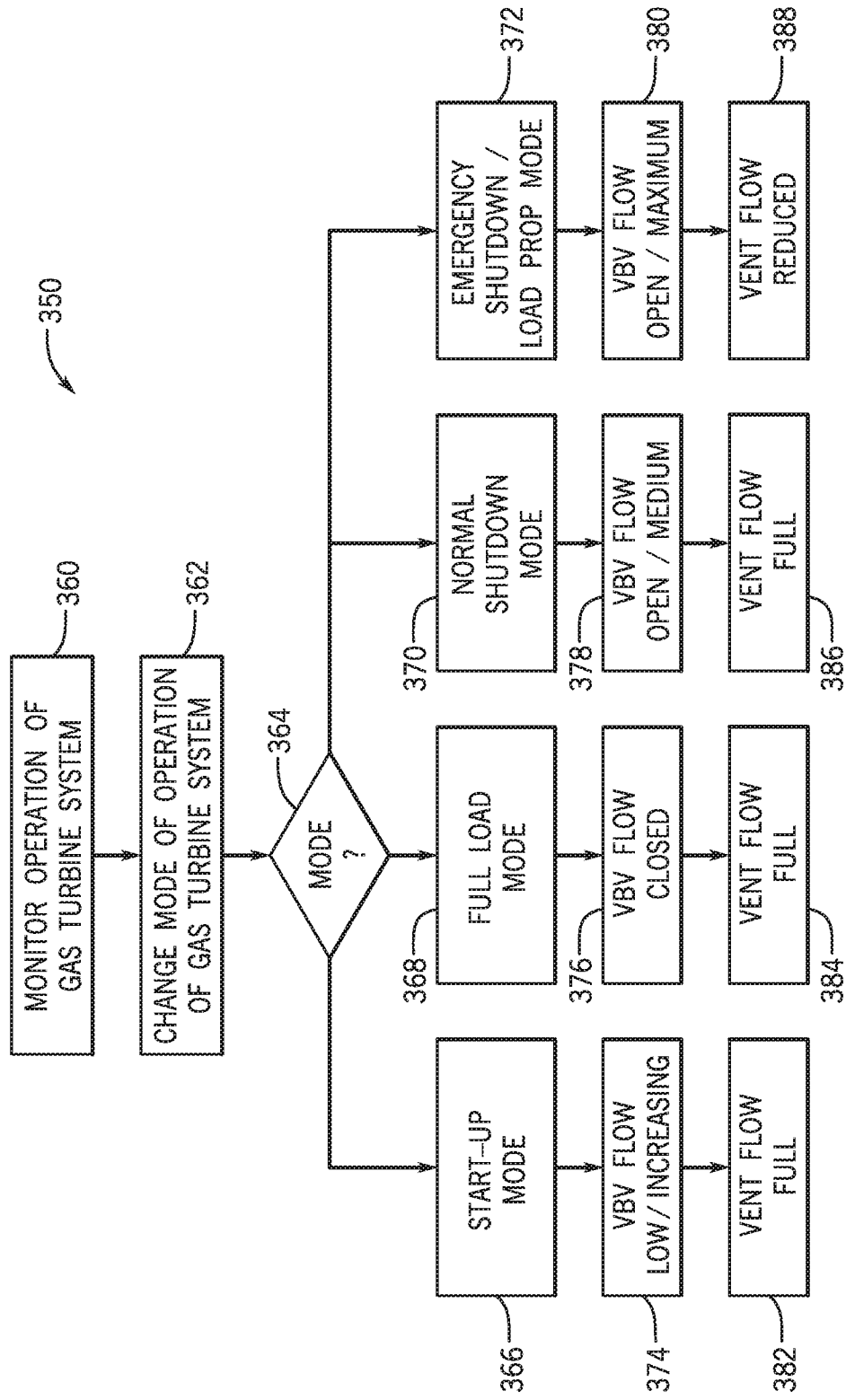
FIG. 7 is a flow chart of an embodiment of a method of operating a gas turbine system in different modes using the flow combiner of FIGS. 1-6.

As mentioned previously, in order to improve the combination of the fluid flow 28 (e.g., compressor bleed flow) and the fluid flow 36 (e.g., ventilation flow), the flow rate associated with each fluid flow may be controlled based on the mode of operation of the gas turbine system 10. FIG. 7 is a flow chart of an embodiment of a method 350 of operating the gas turbine system 10 in different modes using the flow combiner 12 of FIGS. 1-6. The modes of operation may not be limited to the modes described herein, but rather serve as examples. The flow rates associated with the compressor bleed flow 28 and the ventilation flow 36 may be continuously or periodically monitored by the controller 124 via a control algorithm. In the illustrated embodiment, the method 350 includes monitoring operation of the gas turbine system 10 as indicated by block 360, and changing a mode of operation of the gas turbine system 10 based on monitored conditions as indicated by block 362. The method 350 may then query for the mode of operation as indicated by block 364 and proceed with changes depending on the mode of operation.

For example, if the query block 364 indicates a start-up mode 366, then the method 350 may control the variable valve 26 to adjust the compressor bleed flow 28 (e.g., variable bleed valve (VBV) flow) to be relatively low and/or increasing as the gas turbine engine 12 is speeding up, as indicated by block 374. Additionally, in the start-up mode 366, the method 350 may control the fans 38 and/or 94 to adjust the ventilation flow 36, 96 to be at a full flow (e.g., vent flow full), as indicated by block 382. During start-up mode 366, the compressor bleed flow 28 may be increasing but still may operate at a low amount of flow while the ventilation flow 36 may be operating at full flow. During the start-up mode 366, the blades of the compressor are increasing in rotational speed to attain a threshold speed of the gas turbine engine 50. As a result, the compressor bleed flow 28 may operate at a low flow when the gas turbine engine 50 is starting up or beginning to rotate. However, as the blades of the compressor increase in rotational speed and the gas turbine engine 50 moves towards full load operation, the compressor bleed flow 28 may increase but still operate at a lower flow rate compare to the maximum flow rate. Meanwhile, the ventilation flow 36 may be operating at full flow.

If the query block 364 indicates a full load mode 368, then the method 350 may control the variable valve 26 to adjust the compressor bleed flow 28 (e.g., VBV flow) to be fully closed (or nearly closed) as the gas turbine engine 12 is operating at a full load, as indicated by block 376. Additionally, in the full load mode 368, the method 350 may control the fans 38 and/or 94 to adjust the ventilation flow 36, 96 to be at a full flow (e.g., vent flow full), as indicated by block 384. During full load mode 368, the compressor bleed flow 28 may be closed while the ventilation flow 36 may be operating at full flow. When the gas turbine engine 50 is operating at full load mode, the gas turbine engine 50 may be releasing a maximum amount of heat. As a result, the ventilation flow 36 operating at full flow may be useful in cooling the gas turbine engine 50 and the space inside the enclosure 54.

If the query block 364 indicates a normal shutdown mode 370, then the method 350 may control the variable valve 26 to adjust the compressor bleed flow 28 (e.g., VBV flow) to be open at a medium flow as the gas turbine engine 12 is shutting down in a normal manner, as indicated by block 378. The medium flow of the compressor bleed flow 28 may be an intermediate level between no flow and a maximum flow. Additionally, in the normal shutdown mode 370, the method 350 may control the fans 38 and/or 94 to adjust the ventilation flow 36, 96 to be at a full flow (e.g., vent flow full), as indicated by block 386. During normal shutdown mode 370, the gas turbine engine 50 may be gradually slowing down (rather than an urgent or rapid slowing down) due to some unexpected event or emergency. As a result, the variable valve 26 may be opened such that the compressor bleed flow 28 may be operating at a medium amount of flow, while the ventilation flow 36 may be operating at full flow.

If the query block 364 indicates an emergency shutdown and/or load drop mode 372, then the method 350 may control the variable valve 26 to adjust the compressor bleed flow 28 (e.g., VBV flow) to be open at a maximum flow as the gas turbine engine 12 may be rapidly shutting down and/or unexpectedly dropping a load in an urgent manner, as indicated by block 380. Additionally, in the mode 372, the method 350 may control the fans 38 and/or 94 to adjust the ventilation flow 36, 96 to be at a reduced or partial flow (e.g., vent flow reduced less than full flow), as indicated by block 388. During the emergency shutdown and/or load drop mode 372, the compressor bleed flow 28 may be operating at a maximum amount of flow while the ventilation flow 36 may be operating at a reduced amount of flow. The compressor bleed flow 28 may be operating at full capacity in order to reduce the possibility of the gas turbine engine 50 surging or stalling. The compressor bleed flow 28 may be operated at full capacity for a short period of time such as 5 seconds, 10 seconds, or any other suitable time period. Since the compressor bleed flow 28 may be operating at full flow for a reduced amount of time, the flow rate of the ventilation flow 36 may also be reduced.

The flow combiner 12 as described above with reference to FIGS. 1-6 is configured to combine the fluid flows 28 and 36 with the foregoing controls provided by the method 350 of FIG. 7, thereby helping to reduce the possibility of backflow and avoid overloading the silencer section 42 and other portions of the flow combiner 12. Although the illustrated method 350 has some specific modes of operation and corresponding adjustments to the fluid flows 28 and 36, other modes of operation and adjustments to the fluid flows 28 and 36 may be used to help combine the flows through the flow combiner 12.

Technical effects of the invention include a flow combiner 12 for combining the compressor bleed flow 28 and the ventilation flow 36. In particular, the flow combiner 12 may include a shared or common silencer section 42 to attenuate noise from the combined flow 40 (i.e., combination of the compressor bleed flow 28 and the ventilation flow 36). In order to effectively combine flows, the controller 124 may regulate the flow rates associated with the compressor bleed flow 28 and the ventilation flow 36 continuously or periodically based on various modes of operation of the gas turbine system 10. The flow combiner 12 that enables the mixing of the compressor bleed flow 28 and the ventilation flow 36 includes two different inlet ducts 16 and 18. The inlet duct 16 may be designated as an inlet for the bleed flow 28 to enter the flow combiner 12 while the inlet duct 18 may be designated as an inlet for the ventilation flow 36 to enter the flow combiner 12. After both the ventilation flow 36 and compressor bleed flow 28 have entered the flow combiner 12 via their respective inlet ducts 16 and 18 (e.g., passing through the backflow inhibiter 32), both flows may merge within the flow combiner 12. In particular, the inlet duct 16 may include the adjustable valve elements 30 that regulate the volume of the compressor bleed flow 28 via the drive 200 and actuators 204. Meanwhile, the inlet duct 18 may include one or more fans 38 and the damper 31 to regulate the ventilation flow 36 and inhibit backflow of the compressor bleed flow 28 through the inlet duct 18.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
 a flow combiner, comprising:
  an outlet duct;
  a compressor bleed inlet duct coupled to the outlet duct, wherein the compressor bleed inlet duct is configured to receive a bleed flow from a compressor flow path through a compressor of a gas turbine engine; and
  a ventilation inlet duct coupled to the outlet duct, wherein the ventilation inlet duct is configured to receive a ventilation flow from a ventilation flow path through a space within an enclosure surrounding an outermost wall of the gas turbine engine, wherein the ventilation flow path is separate from the compressor flow path and external from the compressor;
 wherein the bleed flow and the ventilation flow are combined as an outlet flow through the outlet duct.

2. The system of claim 1, comprising the enclosure disposed about the space, wherein the flow combiner is coupled to the enclosure, wherein the ventilation flow path of the ventilation flow extends from an intake port in the enclosure, through the space, and into the ventilation inlet duct.

3. The system of claim 2, comprising the gas turbine engine disposed inside the enclosure, wherein the compressor bleed inlet duct is coupled to the outermost wall of the gas turbine engine at the compressor to fluidly couple with the compressor flow path to receive the bleed flow.

4. The system of claim 1, wherein the compressor bleed inlet duct comprises a compressor opening configured to extend circumferentially around the outermost wall of the gas turbine engine at the compressor, wherein the compressor bleed inlet duct comprises a variable bleed valve, wherein the space surrounds the outermost wall of the gas turbine engine and the enclosure surrounds the space, wherein the compressor bleed inlet duct extends through the space from the enclosure to the outermost wall, wherein the flow combiner extends at least partially outside of the enclosure.

5. The system of claim 1, wherein the compressor bleed inlet duct and the ventilation inlet duct are coupled to a common duct portion of the outlet duct.

6. The system of claim 5, wherein the compressor bleed inlet duct comprises a diverging duct portion coupled to the common duct portion, wherein the diverging duct portion diverges in a downstream direction away from the compressor bleed inlet duct and the ventilation inlet duct toward an outlet of the outlet duct.

7. The system of claim 5, wherein the ventilation inlet duct comprises a turning duct portion coupled to the common duct portion.

8. The system of claim 5, wherein the common duct portion comprises a backflow inhibiter having a plurality of conduits varying in cross-sectional flow area.

9. The system of claim 1, wherein the ventilation inlet duct comprises a damper configured to open in response to the ventilation flow, and wherein the compressor bleed inlet duct comprises a plurality of adjustable valve elements to regulate the bleed flow within the flow combiner.

10. The system of claim 1, wherein the outlet duct comprises one or more silencer baffles.

11. The system of claim 1, comprising a controller having a memory, a processor, and instructions stored on the memory and executable by the processor to adjust the bleed flow or the ventilation flow based on one or more operating parameters of the gas turbine system.

12. The system of claim 11, wherein the one or more operating parameters comprise an operational mode of the gas turbine system, wherein the operational mode of the gas turbine system comprises one of a startup mode, a full load mode, a normal shutdown mode, or an emergency shut down/load drop mode.

13. The system of claim 1, wherein the ventilation inlet duct comprises one or more fans.

14. A method, comprising:
receiving a bleed flow from a compressor of a gas turbine engine into a compressor bleed inlet duct coupled to an outlet duct of a flow combiner; and
receiving a ventilation flow from a space within an enclosure surrounding an outermost wall of the gas turbine engine into a ventilation inlet duct coupled to the outlet duct, wherein the bleed flow and the ventilation flow are combined as an outlet flow through the outlet duct, wherein the ventilation flow is driven by at least one fan.

15. The method of claim 14, comprising adjusting, via a controller, the bleed flow or the ventilation flow based on one or more operating parameters of the gas turbine system.

16. The method of claim 15, wherein the one or more operating parameters comprise an operational mode of the gas turbine system, wherein the operational mode of the gas turbine system comprises one of a startup mode, a full load mode, a normal shutdown mode, or an emergency shut down/load drop mode.

17. The method of claim 14, comprising adjusting the bleed flow via a variable bleed valve coupled to the compressor bleed inlet duct, and reducing noise via one or more silencer baffles disposed in the outlet duct.

18. A system, comprising:
a flow combiner, comprising:
an outlet duct;
a first inlet duct coupled to the outlet duct, wherein the first inlet duct is configured to receive a high energy flow from a first flow path within a gas turbine engine; and
a second inlet duct coupled to the outlet duct, wherein the second inlet duct is configured to receive a low energy flow from a second flow path within an enclosure outside of an outermost wall of the gas turbine engine, wherein the low energy flow is driven by at least one fan;
wherein the high energy flow and the low energy flow are combined as an outlet flow through the outlet duct.

19. The system of claim 18, comprising a controller having a memory, a processor, and instructions stored on the memory and executable by the processor to selectively adjust the high energy flow via an adjustable valve and the low energy flow via the at least one fan based on one or more operating parameters of the gas turbine engine, wherein the at least one fan comprises a first fan disposed outside of the enclosure or a second fan disposed inside of the second inlet duct.

20. The system of claim 18, wherein the first inlet duct comprises a compressor bleed inlet duct having an adjustable valve configured to adjust a bleed flow as the high energy flow, wherein the compressor bleed inlet duct is configured to couple with the outermost wall of the gas turbine engine at a compressor, wherein the second inlet duct comprises a ventilation inlet duct having the at least one fan configured to control a ventilation flow as the low energy flow, wherein the ventilation inlet duct is configured to couple to the enclosure, wherein the ventilation flow extends along the second flow path from an intake port in the enclosure, through a space inside the enclosure and outside of the outermost wall, and into the ventilation inlet duct.

* * * * *